United States Patent Office 3,355,483
Patented Nov. 28, 1967

3,355,483
ALKYL SUBSTITUTED DIFUNCTIONAL HEXANES
Joseph B. Dickey and Edmund B. Towne, Kingsport, Tenn., assignors to Eastman Kodak Company, Rochester, N.Y., a corporation of New Jersey
No Drawing. Filed Mar. 5, 1965, Ser. No. 437,572
7 Claims. (Cl. 260—488)

This invention relates to novel chemical compounds and processes of preparing the same. More particularly, this invention is concerned with novel dialdehydes, diols and diamines and chemical reactions used for producing such compounds.

According to the present invention, there are provided novel 1,6-hexanedials and acetals thereof, 1,6-hexanediols and 1,6-hexanediamines of the formula:

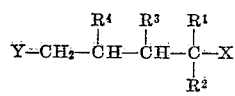

wherein $R^1$, $R^2$, $R^3$, and $R^4$ represent hydrogen or the same or different lower alkyl groups, particularly lower alkyls having 1 to 5 carbon atoms such as methyl, ethyl, propyl, etc., and at least three of the groups represented by $R^1$, $R^2$, $R^3$, and $R^4$ are lower alkyl and X and Y represent formyl, hydroxymethyl, aminomethyl and a di(acyloxy)methyl group such as

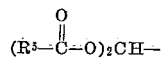

wherein $R^5$ is a lower alkyl group such as methyl, ethyl, propyl, etc., or a di(alkoxy)methyl group such as $(R^6O)_2CH-$ wherein $R^6$ is a lower alkyl such as methyl, ethyl, propyl, etc.

In preparing the compounds of this invention, it is advisable to first prepare the 1,6-hexanedials, acetals and alkanoates thereof. These compounds can be conveniently produced by the novel process of reacting an appropriate 3- or 4-pentenal, acetal or alkanoate thereof with carbon monoxide and hydrogen in the presence of a cobalt hydroformylation catalyst using such conditions of heat and pressure as may be needed to facilitate the reaction. This process can be represented as follows:

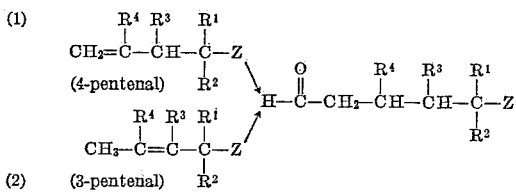

wherein $R^1$, $R^2$, $R^3$, and $R^4$ are hydrogen or lower alkyl; at least three of the groups $R^1$, $R^2$, $R^3$, and $R^4$ are lower alkyl, and Z is formyl, di(acyloxy)methyl of the formula

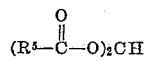

or di(alkoxy)methyl of the formula $(R^6O)_2CH-$.

Among the 3- and 4-pentenals, acetals and alkanoates which can be used as starting materials in the process are 2,2,4-trimethyl-4-pentenal;
2,2,4-trimethyl-4-pentenal diethylacetal;
2,2,4-trimethyl-4-pentenal diacetate;
2,2,3-trimethyl-4-pentenal;
2,2,3-trimethyl-4-pentenal dipropylacetal;
2,2,3-trimethyl-3-pentenal dipropionate;
2,2,3,4-tetramethyl-3-pentenal;
2,2,3,4-tetramethyl-3-pentenal dimethylacetal;
2,2,3,4-tetramethyl-4-pentenal;
2,3,4-trimethyl-3-pentenal;
2,2-dimethyl-4-ethyl-4-pentenal;
2,2-diethyl-3-propyl-3-pentenal; and
2,3,4-triethyl-4-pentenal diethylacetal.

The 2,2,4-trimethyl-4-pentenal starting material is disclosed in the J. Am. Chem. Soc. 81, 3379 (1959). Other 4-pentenals having lower alkyl groups in the 2,3 and 4 positions can be produced by the procedures disclosed therein. Wagner and Zook, "Synthetic Organic Chemistry" (John Wiley & Sons, Inc., 1953) page 49 discloses procedures for preparing the 3-pentenals.

Hydroformylation of the pentenal can be conveniently effected by bringing the pentenal, carbon monoxide and hydrogen together in the presence of a cobalt catalyst in a suitable inert liquid reaction medium. Cobalt carbonyl is particularly suitable as the catalyst. Naphtha can be used as the reaction medium although other inert organic liquids can be employed. Elevated temperatures of about 100 to 200° C. or higher and elevated pressures of about 300 to 1000 p.s.i. or higher are generally employed to give the desired reaction product. The reactants are usually maintained under such conditions for about fifteen minutes to one hour or until such time as the reaction is terminated. After the reaction is terminated, the reaction mixture can be filtered, the reaction medium removed by distillation and the product recovered by distillation under reduced pressure.

Representative of the 1,6-hexanedials, acetals and alkanoates which are produced in this way are:

2,2,4-trimethyl-1,6-hexanedial;
2,2,3-trimethyl-1,6-hexanedial;
2,2,4-trimethyl-1,6-hexanedial-1-diethylacetal;
2,2,4-trimethyl-1,6-hexanedial-1-diacetate;
2,2,3,4-tetramethyl-1,6-hexanedial;
2,3,4-trimethyl-1,6-hexanedial;
2,2-dimethyl-4-ethyl-1,6-hexanedial;
2,2-diethyl-3-propyl-1,6-hexanedial; and
2,3,4-triethyl-1,6-hexanedial-1-diacetate.

The free aldehyde group on such compounds can be readily converted to an acetal by reacting the aldehyde with an alcohol in the presence of a mineral acid catalyst. Elevated temperatures up to about 200° C. are suitable although the reflux temperature is preferred. Following reaction, the mixture can be cooled, neutralized and the product isolated by conventional procedures.

The following acetals are typical of those which are prepared in this way:

2,2,4-trimethyl-1,6-hexanedial-1,6-di-diethylacetal; and
2,2,4-trimethyl-1,6-hexanedial-1-diethylacetal-6-dimethylacetal.

The free aldehyde group on such compounds can also be converted to a di(acyloxy) group by reaction with an appropriate lower carboxylic acid anhydride such as acetic anhydride and propionic anhydride. In this way, compounds such as 2,2,4-trimethyl-1,6-hexanedial-1,6-di-diacetate are produced.

By hydrolysis with a mineral acid such as hydrochloric acid, the acetals and dialkanoates can be converted to the free aldeheydes.

Heating of the dialkanoates at an elevated temperature also can be used to form the free aldehydes.

The 1,6-hexanedials, acetals and alkanoates thereof such as those just named can be catalytically hydrogenated to produce novel 1,6-hexanediols. The reduction is readily achieved using a Raney nickel catalyst, a lower alcohol as the reduction medium, hydrogen pressures of about 500 to 2000 p.s.i. and temperatures of about 100 to 200° C. The progress of the reduction is followed by the hydrogen uptake which is generally completed in about 1 to 4 hours. After terminating the reaction, the catalyst is removed by filtration, the alcohol distilled off and the product purified, such as by crystallization from benzene.

Some of the novel 1,6-hexanediols produced in this way are:

2,2,4-trimethyl-1,6-hexanediol;
2,2,3-trimethyl-1,6-hexanediol;
2,2,3,4-tetramethyl-1,6-hexanediol;
2,4,4-trimethyl-1,6-hexanediol;
2,3,4-trimethyl-1,6-hexanediol;
2,2-dimethyl-4-ethyl-1,6-hexanediol;
2,2-diethyl-3-propyl-1,6-hexanediol; and
2,3,4-triethyl-1,6-hexanediol.

The 1,6-hexanediols, acetals and alkanoates thereof can be readily converted to 1,6-hexanediamines by reductive amination using ammonia, hydrogen and Raney nickel as the catalyst. The reaction can be effected by catalytic hydrogenation of the 1,6-hexanedial in an ethanolic solution of ammonia under pressure from about 300 to 2000 p.s.i. and a temperature from about 40° C. to 170° C. The reaction can usually be terminated in about 1 to 5 hours, the reaction mixture filtered and the solvent removed by distillation. The product can be purified by distillation under reduced pressure.

The following compounds are illustrative of those which can be produced in this way:

2,2,4-trimethyl-1,6-hexanediamine;
2,2,3-trimethyl-1,6-hexanediamine;
2,2,3,4-tetramethyl-1,6-hexanediamine;
2,3,4-trimethyl-1,6-hexanediamine;
2,2-dimethyl-4-ethyl-1,6-hexanediamine;
2,2-diethyl-3-propyl-1,6-hexanediamine; and
2,3,4-triethyl-1,6-hexanediamine.

The 1,6-hexanediols, acetals and alkanoates thereof can also be converted to 1,6-hexanedicarboxylic acids by oxidation, such as with 50% nitric acid. The reaction temperature is maintained at about 50 to 75° C. After the reaction is terminated, the mixture can be cooled to about 0° C. and the mixture filtered to isolate the desired product.

By this or other conventional oxidation procedures, acids such as the following can be produced from the corresponding 1,6-hexanedials:

2,2,4-trimethyl-1,6-hexanedicarboxylic acid;
2,2,3-trimethyl-1,6-hexanedicarboxylic acid;
2,2,3,4-tetramethyl-1,6-hexanedicarboxylic acid;
2,3,4-trimethyl-1,6-hexanedicarboxylic acid;
2,2-dimethyl-4-ethyl-1,6-hexanedicarboxylic acid;
2,2-diethyl-3-propyl-1,6-hexanedicarboxylic acid; and
2,3,4-triethyl-1,6-hexanedicarboxylic acid.

The novel compounds provided by this invention are useful in making polyamides and polyesters possessed of outstanding properties. In addition, the 1,6-hexanediamines can be used as neutralizing agents for acids and the 1,6-hexanedicarboxylic acids can be used to neutralize bases.

EXAMPLE 1

*2,2,4-trimethyl-1,6-hexanedial*

Two liters of naphtha and 6 g. of cobalt carbonyl were charged into a 1 gal. stirred autoclave, the autoclave closed and pressured to 800 p.s.i. with hydrogen. Then a 50–50 mixture of CO—$H_2$ was added to 2000 p.s.i. The mixture was heated to 150° C. and then 630 g. (5 moles) of 2,2,4-trimethyl-3-pentenal was pumped into the autoclave during ten minutes. Heating was discontinued 17 minutes later.

A little more than 10 moles of the CO—$H_2$ mixture was absorbed, 10 moles being theory. The reaction mixture was filtered and distilled in an $N_2$ atmosphere from a steam bath at 8 mm. to remove the naphtha. The naphtha distilled over at 40–60°/8 mm. The residual product weighed 770 g. A 77 g. aliquot of the product was flashed over as rapidly as possible from a distilling flask under $N_2$ at 117° C. and 9 mm. The yield of 2,2,4-trimethyl-1,6-hexanedial was 50 g. (65%).

EXAMPLE 2

*2,2,4-trimethyl-1,6-hexanedial-1-diacetate*

The procedure of Example 1 was followed except that 2,2,4-trimethyl-3-pentenal-1-diacetate was used instead of the free aldehyde. The product 2,2,4-trimethyl-1,6-hexanedial-1-diacetate was obtained in 70% yield. On distillation, the product was deacetylated to 2,2,4-trimethyl-1,6-hexanedial.

EXAMPLE 3

*2,2,4-trimethyl-1,6-hexanedial-1-diethylacetal*

600 grams (3 moles) of 2,2,4-trimethyl-3-pentenal diethylacetal was oxonated, as in Example 1, to form 2,2,4-trimethyl-1,6-hexanedial-1-diethylacetal. After filtering, the reaction mixture was treated with a drop of concentrated sulfuric acid and then was distilled from a steam bath to remove the naphtha. The residual product weighed 400 g. and upon distillation there was obtained 280 g. (60%) of 2,2,4-trimethyl-1,6-hexanedial, B.P. 117° C. at 9 mm.

The 2,2,4-trimethyl-3-pentenal used in this example was prepared as follows:

144 grams (1 mole) of 2,2,4-trimethyl-3-hydroxypentanol was heated on a steam bath with 150 cc. of ethanol containing a small amount of conc. HCl for 4 hours. The reaction mixture was neutralized with sodium bicarbonate solution and then washed with water repeatedly. After drying over sodium sulfate, the 2,2,4-trimethyl-3-hydroxypentanal diethylacetal was distilled at reduced pressure. Yield, 174 g. (80%).

218 grams (1 mole) of 2,2,4-trimethyl-3-hydroxypentanal diethylacetal was heated at 100° C. for 4 hours with 108 g. of acetic anhydride. The product, 2,2,4-trimethyl-3-acetoxypentanal diethylacetal, was washed with water, dried and distilled. The yield of product was 224 g. (90%).

One mole (260 g.) of 2,2,4-trimethyl-3-acetoxypentanal diethylacetal was cracked at about 625° C. The cracking was carried out in a 32 mm. Pyrex perpendicular tube packed with Pyrex chips and heated in a furnace. The tube was fitted with a dropping funnel, a nitrogen inlet and a receiving flask leading to a Dry Ice trap. The acetal was added at about 25 g. per hour in a slow nitrogen stream. The resulting product, 2,2,4-trimethyl-3-pentenal diethylacetal, was taken up in benzene and washed with water until neutral, and dried. The product was distilled under reduced pressure in a nitrogen atmosphere to yield 144 g. (72%), B.P. 95–100° C. at 33 mm.

EXAMPLE 4

*2,2,4-trimethyl-1,6-hexanediol*

One mole (156 g.) of 2,2,4-trimethyl-1,6-hexanedial dissolved in 400 cc. of ethanol was placed in a 1 liter shaking autoclave with 15 g. of Raney nickel catalyst. The autoclave was closed and pressured with 1500 lbs. of hydrogen and heated to 150° C. Nearly 2 moles of hydrogen were absorbed during 4 hours. The reaction product was filtered and upon removal of the ethanol and cooling, 144 g. (90%) of product was obtained. The product was crystallized from benzene, M.P. 97–99° C.; B.P. 170–175° C. at 23 mm.

EXAMPLE 5

*2,2,4-trimethyl-1,6-hexanediamine*

One mole (156 g.) of 2,2,4-trimethyl-1,6-hexanedial dissolved in 400 cc. of ethanol was placed in a 1 liter shaking autoclave with 15 g. of Raney nickel catalyst. The autoclave was closed and pressured with 300 pounds of ammonia and then with 1500 lbs. of hydrogen. It was heated to 150° C. for 6 hours. Upon cooling, the reaction product was filtered and distilled under $N_2$ to remove the ethanol solvent. The yield of product was 95 g. (60%). Further distillation of an aliquot under reduced pressure yielded pure 2,2,4-trimethyl-1,6-hexanediamine, B.P. 135–137° C. at 23 mm.

EXAMPLE 6

*2,2,4-trimethyl-1,6-hexanedicarboxylic acid*

One mole (156 g.) of 2,2,4-trimethyl-1,6-hexanedial was oxidized by carefully adding the aldehyde through a dropping funnel to a stirred mixture of 285 cc. (2.2 moles) 50% $HNO_3$ containing 0.3 g. of ammonium vanadate. After oxidation started, the temperature was maintained at 55–60° C. by cooling. The bulk of the aldehyde was then added as rapidly as possible while keeping the temperature between 55–60° C. After the addition was completed, stirring was continued for 1 hour. The reaction mixture was cooled to 0° C. and the 2,2,4-trimethyl-1,6-hexanedicarboxylic acid was collected on a filter and washed with ice water and dried overnight. The yield of white crystals was 167 g. (89%), M.P. 78–79° C.

The product formed a diethyl ester, B.P. 107° C.

As stated hereinbefore, the novel compounds of our invention are unexpectedly useful in preparing polymers having outstanding properties. Polyamides containing substantial amounts of 2,2,4-trimethyl-1,6-hexanediamine are amorphous plastics which can be molded into clear articles having good impact strengths whereas known polyamide plastics are crystalline and, when molded, give opaque articles having relatively low impact strengths. In addition, articles molded of polymers containing our novel compounds are resistant to fatigue and retain their strength for long periods of time whereas known polymers are not so resistant to fatigue.

Although the invention has been described in considerable detail with particular reference to certain preferred embodiments thereof, variations and modifications can be effected within the spirit and scope of the invention as described hereinbefore and as defined in the appended claims.

We claim:

1. A compound of the formula:

$$Y-CH_2-\underset{\underset{R^2}{|}}{\overset{\overset{R^4}{|}}{C}H}-\overset{\overset{R^3}{|}}{C}H-\overset{\overset{R^1}{|}}{\underset{\underset{R^2}{|}}{C}}-X$$

wherein $R^1$, $R^2$, $R^3$ and $R^4$ represent hydrogen or lower alkyl groups and wherein at least three of the groups represented by $R^1$, $R^2$, $R^3$ and $R^4$ are lower alkyl, and wherein Y represents formyl and X represents a group selected from the following:

(1) di-(acyloxy)methyl groups having the structural formula $$(R^5-\overset{\overset{O}{\|}}{C}-O)_2CH-$$

wherein $R^5$ is a lower alkyl group, and (2) di-(alkoxy) methyl groups having the structural formula $(R^6O)_2CH-$ wherein $R^6$ is a lower alkyl group.

2. A compound of the formula:

$$H-\overset{\overset{O}{\|}}{C}-CH_2-\overset{\overset{R^4}{|}}{C}H-\overset{\overset{R^3}{|}}{C}H-\overset{\overset{R^1}{|}}{\underset{\underset{R^2}{|}}{C}}-CH\overset{O-\overset{\overset{O}{\|}}{C}-R^5}{\underset{O-\overset{\overset{O}{\|}}{C}-R^5}{}}$$

wherein $R^1$, $R^2$, $R^3$ and $R^4$ are selected from the group consisting of hydrogen and lower alkyl groups; at least three of the groups $R^1$, $R^2$, $R^3$ and $R^4$ are lower alkyl, and $R^5$ is lower alkyl.

3. A compound of the formula:

$$H-\overset{\overset{O}{\|}}{C}-CH_2-\overset{\overset{R^4}{|}}{C}H-\overset{\overset{R^3}{|}}{C}H-\overset{\overset{R^1}{|}}{\underset{\underset{R^2}{|}}{C}}-CH\overset{O-R^6}{\underset{O-R^6}{}}$$

wherein $R^1$, $R^2$, $R^3$ and $R^4$ are selected from the group consisting of hydrogen and lower alkyl; at least three of the groups $R^1$, $R^2$, $R^3$ and $R^4$ are lower alkyl, and $R^6$ is lower alkyl.

4. A compound of the formula:

$$H-\overset{\overset{O}{\|}}{C}-CH_2-\overset{\overset{CH_3}{|}}{C}H-CH_2-\overset{\overset{CH_3}{|}}{\underset{\underset{CH_3}{|}}{C}}-CH\overset{O-R^6}{\underset{O-R^6}{}}$$

wherein $R^6$ is lower alkyl.

5. A compound of the formula:

$$H-\overset{\overset{O}{\|}}{C}-CH_2-\overset{\overset{CH_3}{|}}{C}H-CH_2-\overset{\overset{CH_3}{|}}{\underset{\underset{CH_3}{|}}{C}}-CH\overset{O-\overset{\overset{O}{\|}}{C}-R^5}{\underset{O-\overset{\overset{O}{\|}}{C}-R^5}{}}$$

wherein $R^5$ is lower alkyl.

6. 2,2,4-trimethyl-1,6-hexanedial-1-diacetate.
7. 2,2,4-trimethyl-1,6-hexanedial-1-diethylacetal.

References Cited

UNITED STATES PATENTS

| | | | |
|---|---|---|---|
| 2,820,014 | 1/1958 | Hartley et al. | 260—488 |
| 2,820,059 | 1/1958 | Hasek et al. | 260—602 |
| 2,497,303 | 2/1950 | Gresham et al. | 260—604 |

FOREIGN PATENTS

| | | |
|---|---|---|
| 1,373,759 | 10/1964 | France. |
| 1,376,297 | 10/1964 | France. |

OTHER REFERENCES

Chemical Abstracts, 59:5032h (1963).

LORRAINE A. WEINBERGER, *Primary Examiner.*

V. G. GARNER, *Assistant Examiner.*